(12) United States Patent
Mikkola et al.

(10) Patent No.: US 12,477,239 B2
(45) Date of Patent: Nov. 18, 2025

(54) EVENT-BASED SENSOR SYSTEM AND METHOD FOR OPERATING AN EVENT-BASED SENSOR SYSTEM

(71) Applicant: Alphacore, Inc., Tempe, AZ (US)

(72) Inventors: Esko Mikkola, Mesa, AZ (US); Phaneendra Bikkina, Tempe, AZ (US)

(73) Assignee: Alphacore, Inc., Tempe, AZ (US)

( * ) Notice: Subject to any disclaimer, the term of this patent is extended or adjusted under 35 U.S.C. 154(b) by 246 days.

(21) Appl. No.: 18/220,760

(22) Filed: Jul. 11, 2023

(65) Prior Publication Data

US 2024/0015413 A1  Jan. 11, 2024

Related U.S. Application Data

(60) Provisional application No. 63/388,217, filed on Jul. 11, 2022.

(51) Int. Cl.
*H04N 25/47* (2023.01)
*H04N 25/78* (2023.01)

(52) U.S. Cl.
CPC ............. *H04N 25/47* (2023.01); *H04N 25/78* (2023.01)

(58) Field of Classification Search
CPC .............................. H04N 25/47; H04N 25/78
See application file for complete search history.

(56) References Cited

U.S. PATENT DOCUMENTS

| | | | |
|---|---|---|---|
| 2005/0273661 A1* | 12/2005 | Brajovic | H04N 25/47 714/30 |
| 2016/0093327 A1 | 3/2016 | Di Franco et al. | |
| 2021/0084246 A1* | 3/2021 | Mostafalu | H04N 25/78 |
| 2021/0250528 A1 | 8/2021 | Kim et al. | |
| 2022/0210349 A1 | 6/2022 | Bong et al. | |
| 2022/0239851 A1 | 7/2022 | Brändli et al. | |
| 2023/0156355 A1 | 5/2023 | Kim et al. | |

OTHER PUBLICATIONS

Inivation, "Davis 346", updated Aug. 15, 2019, 4 pgs.
Gallego, Guillermo et al. "Event-based Vision: A Survey", Aug. 8, 2020, 30 pgs.

* cited by examiner

*Primary Examiner* — Nicholas G Giles
(74) *Attorney, Agent, or Firm* — LOZA & LOZA, LLP (57) ABSTRACT

Event-based sensor systems and method for operating event-based sensor systems are disclosed. A sensor system includes an array of sensor elements arranged in columns and rows, wherein each sensor element in the array of sensor elements includes, a detector circuit, an active pixel sensor (APS) circuit, and a dynamic vision sensor (DVS) circuit, the DVS circuit including an event trigger switch configured to control application of a signal on an event trigger line in response to a pixel-specific event trigger signal.

13 Claims, 6 Drawing Sheets

| TDC Time Steps | Code | $T_{x1}$ | $T_{x2}$ | $T_{x3}$ | $T_{y1}$ | $T_{y2}$ | $T_{y3}$ |
|---|---|---|---|---|---|---|---|
| 1.25ns (t0) | 000 | 1 | 0 | 0 | 1 | 0 | 0 |
| 2.5ns | 001 | 0 | 0 | 0 | 0 | 0 | 0 |
| 3.75ns | 010 | 0 | 0 | 0 | 0 | 0 | 0 |
| 5ns (t1) | 011 | 0 | 1 | 0 | 0 | 1 | 0 |
| 6.25ns | 100 | 0 | 0 | 0 | 0 | 0 | 0 |
| 7.5ns (t2) | 101 | 0 | 0 | 0 | 0 | 0 | 0 |
| 8.75ns | 110 | 0 | 0 | 1 | 0 | 0 | 1 |
| 10ns | 111 | 0 | 0 | 0 | 0 | 0 | 0 |

$T_{xi}t_k = T_{yi}t_k = 1 \rightarrow P_{i,i} = 1$ $T_{xi}t_k = T_{yj}t_k = 1 \rightarrow P_{i,j} = 1$

EVENT-BASED SENSOR SYSTEM AND METHOD FOR OPERATING AN EVENT-BASED SENSOR SYSTEM

CROSS-REFERENCE TO RELATED APPLICATION

This application claims priority to provisional U.S. Patent Application Ser. No. 63/388,217, filed Jul. 11, 2022, which is incorporated by reference herein.

BACKGROUND

Event-based sensor/vision systems, specifically Dynamic Vision Systems (DVS), are a class of sensors that mimic the operation of the human visual system by capturing visual information in an event-driven manner. Traditional cameras capture entire frames at a fixed rate, resulting in a continuous stream of images. In contrast, DVS sensors detect and report pixel-level brightness changes asynchronously as events, providing a more efficient and selective representation of visual information.

A fundamental principle behind DVS is the concept of spatiotemporal contrast, which means that the sensor only transmits information when there is a significant change in the scene. These changes are represented as events with a timestamp and the spatial coordinates of the pixel where the change occurred. For example, if an object moves quickly across the visual field, only the pixels affected by the motion will generate events, resulting in a sparse and temporally precise representation of the scene.

DVS sensor systems offer several advantages over traditional frame-based cameras. For example, DVS sensor systems provide extremely low latency, with event detection and transmission occurring in microseconds. Such real-time responsiveness is particularly beneficial for high-speed robotic applications, visual tracking, and other time-critical tasks. Additionally, DVS sensor systems have high dynamic range capabilities, which enables the capture of both bright and dark scenes with reduced saturation or loss of details.

Another benefit of DVS sensor systems is high temporal resolution. Since events are generated only when there is a change in the scene, the sensors can capture fast-moving objects with precise timing. Although conventional DVS sensor systems are able to operate at high event rates with low latency, faster event processing can further improve the performance of such DVS sensor systems.

SUMMARY

Event-based sensor systems and method for operating event-based sensor systems are disclosed. A sensor system includes an array of sensor elements arranged in columns and rows, wherein each sensor element in the array of sensor elements includes, a detector circuit, an active pixel sensor (APS) circuit, and a dynamic vision sensor (DVS) circuit, the DVS circuit including an event trigger switch configured to control application of a signal on an event trigger line in response to a pixel-specific event trigger signal.

In an embodiment, the sensor system further includes a column-specific event trigger line connected to each column, and a column-specific detector circuit connected to each column-specific event trigger line, and a row-specific event trigger line connected to each row, and a row-specific detector circuit connected to each row-specific event trigger line.

In an embodiment, the sensor system further includes a digital data processor configured to identify a sensor element in the array of sensor elements at which an event was detected in response to digital data from the column-specific detector circuits and from the row-specific detector circuits.

In an embodiment, the column-specific detector circuits are column-specific time-to-digital converters (TDCs), and the row-specific detector circuits are row-specific TDCs.

In an embodiment, the column-specific detector circuits are column-specific analog-to-digital converters (ADCs), and the row-specific detector circuits are row-specific ADCs.

In an embodiment, the DVS circuit of each sensor element of the array of sensor elements further includes an event trigger circuit configured to generate the pixel-specific event trigger signal in response to detection of an event at the sensor element.

Another embodiment of a sensor system includes an array of sensor elements arranged in columns and rows, column event trigger lines connecting sensor elements in the same column, row event trigger lines connecting sensor elements in the same row, where each sensor element in the array of sensor elements includes, a detector circuit, an APS circuit, and a DVS circuit, the DVS circuit including a signal source connected to at least one of a respective column event trigger line and a row event trigger line, an event trigger switch connected between the signal source and the at least one of the respective column event trigger line and row event trigger line, and an event trigger circuit configured to generate an event trigger signal that controls the event trigger switch in response to detection of an event at the sensor element, thereby controlling application of a signal from the signal source onto at least one of the respective column event trigger line and row event trigger line.

In an embodiment, the sensor system further includes a column-specific converter circuit connected to each column event trigger line, and a row-specific converter circuit connected to each row event trigger line.

In an embodiment, the sensor system further includes a digital data processor configured to identify a sensor element in the array of sensor elements at which the event was detected in response to digital data from the column-specific detector circuits and from the row-specific detector circuits.

In an embodiment, the column-specific converter circuits and the row-specific converter circuits are TDCs.

In an embodiment, the column-specific converter circuits and the row-specific converter circuits are ADCs.

In an embodiment, each DVS circuit of each sensor element is connected to both a column event trigger line and a row event trigger line such that the signal from the signal source is applied to both the column event trigger line and the row event trigger line.

A method for operating a sensor system is disclosed. The method involves detecting an event at a DVS circuit of a sensor element of an event-based sensor system that includes an array of sensor elements arranged in columns and rows, and triggering a signal on an event trigger line of the event-based sensor system in response to detecting the event, wherein the event trigger line connects sensor elements in at least one of the columns and rows of the array of sensors.

In an embodiment, triggering a signal on the event trigger line includes generating an event trigger signal in response to detecting the event, and activating an event trigger switch to connect a signal source of the sensor element to the event trigger line.

In an embodiment, triggering a signal on the event trigger line includes generating an event trigger signal at the DVS circuit of the sensor element in response to detecting the event at the DVS circuit, and activating an event trigger switch of the DVS circuit to connect a current source of the sensor element to the event trigger line.

In an embodiment, triggering a signal on the event trigger line includes triggering a signal on a column event trigger line of the sensor system and triggering a signal on a row event trigger line of the sensor system.

In an embodiment, the method further involves converting the signals on the column and row event trigger lines to digital data, and identifying the spatial coordinates of the sensor element at which the event was detected in response to the digital data.

In an embodiment, the method further involves converting the signals on the column and row event trigger line to digital data with column and row specific TDCs.

In an embodiment, the method further involves converting the signals on the column and row event trigger line to digital data with column and row specific ADCs.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Conventional event-based sensor systems typically utilize an acknowledgement, or handshake, protocol to identify the spatial coordinates of the pixels at which events are detected. Although an acknowledgement, or handshake, protocol works to identify pixels at which events are detected, such an approach can add latency to event-based sensing systems. In accordance with an embodiment of the invention, a sensor system includes an array of sensor elements arranged in columns and rows, where each sensor element in the array of sensor elements includes a detector circuit, an active pixel sensor (APS) circuit, and a dynamic vision sensor (DVS) circuit, and the DVS circuit includes an event trigger switch configured to control application of a signal on an event trigger line in response to a pixel-specific event trigger signal. The sensing system may further include a column-specific event trigger line connected to each column, and a column-specific detector circuit connected to each column-specific event trigger line, and a row-specific event trigger line connected to each row, and a row-specific detector circuit connected to each row-specific event trigger line. In some embodiments, the column/row detector circuits may be time-to-digital converters (TDCs) and in other embodiments, the column/row detector circuits may be analog-to-digital converters (ADCs). Applying signals on event trigger lines in response to pixel-specific event trigger signals enables an open loop arbitration scheme that can identify the spatial coordinates of pixels, at which events have been detected, without the need for an acknowledgement or handshake. For example, once an event is identified at a pixel and a pixel-specific event trigger signal is generated, a current source will start sinking a small current on to column and row event trigger lines, which results in spikes of different rise time and amplitude depending on how many pixels have been triggered and the location of the pixels in column and row, thereby producing digital data that can be used to identify the spatial coordinates of pixels at which events have been detected. Such an open loop approach to identifying the spatial coordinates of pixels at which events have been detected can improve the efficiency of event-based sensing for applications such as target locking, tracking, and data compression.

Figure 1:
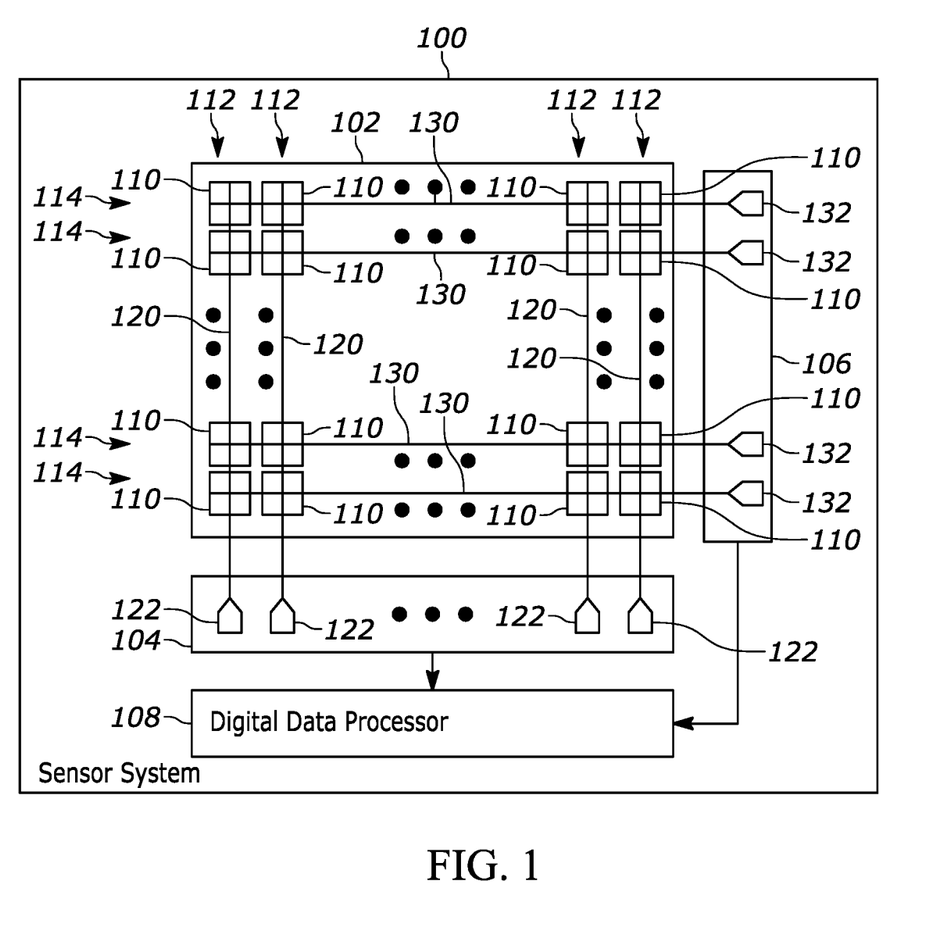
FIG. 1 depicts an example of a sensor system that includes an array of sensor elements, a column sensor block, a row sensor block, and a digital data processor.

FIG. 1 depicts an example of a sensor system 100, such as an event-based sensor system, that includes an array 102 of sensor elements 110 (e.g., pixels), a column sensor block 104, a row sensor block 106, and a digital data processor 108. The sensor elements 110 in the array 102 include circuits that are configured to sense electromagnetic energy, such as energy in the visible light spectrum, and/or in other electromagnetic spectrums such as infrared (IR), mid-wave IR (MWIR), and short-wave IR (SWIR). The array of sensor elements is organized into columns 112 and rows 114 of sensor elements 110 as is known in the field. For example, the array of sensor elements may be an array of 1,024×720 sensor elements, although other sizes of the array are possible, such as 1,024×1,024, 640×480. In an embodiment, the array of sensor elements is an M×N array, where M is the number of columns and N is the number of rows and both M and N are integers of 1 or more. In the example of FIG. 1, sensor elements 110 are shown only at the corners of the array 102 for simplicity of the figure, although it should be understood that the pixel array typically includes a fully packed array of equally spaced sensor elements across the columns and rows of the array. The terms "sensor element" and "pixel" are used interchangeably throughout to refer to a circuit for sensing electromagnetic energy as described with reference to FIG. 2.

As is described further below, the sensor system 100 includes column event trigger lines 120 and row event trigger lines 130, also referred to as column pulse lines and row pulse lines. With respect to the column event trigger lines 120, each column 112 of the sensor system includes a column event trigger line that is specific to that column of sensor elements 110, such that there is a column-specific event trigger line for each column in the array. The column event trigger lines are conductive paths that connect each sensor element in that particular column. The conductive paths enable an electrical signal (e.g., an electrical current) to be conducted from every one of the sensor elements in the column to a column-specific converter circuit 122, such as a time-to-digital converter (TDC) or an analog-to-digital converter (ADC), which is located at an end of the respective column. In an embodiment, a sensor array that includes M columns will include M column-specific event trigger lines 120, where M is an integer of one or more.

With respect to the row event trigger lines 130, each row 114 of the sensor system includes a row event trigger line that is specific to that row of sensor elements 110, such that there is a row-specific event trigger line for each row in the array. The row event trigger lines are conductive paths that connect each sensor element in that particular row. The conductive paths enable an electrical signal (e.g., an electrical current) to be conducted from every one of the sensor elements in the row to a row-specific converter circuit 132, such as a TDC or an ADC, which is located at an end of the respective row. In an embodiment, a sensor array that includes N rows will include N row-specific event trigger lines 130, where N is an integer of one or more.

The column sensor block 104 includes a column-specific converter circuit 122 (e.g., TDC or ADC) for each column 112 of sensor elements 110 in the array of sensor elements, e.g., M column-specific converter circuits. In an embodiment, each column-specific converter circuit 122 (e.g., TDC or ADC) for a column of sensor elements is electrically connected to the respective column event trigger line 120 so that the column-specific converter circuit 122 can convert an analog signal that is carried on the respective column event trigger line into digital data. Likewise, the row sensor block 106 includes a row-specific converter circuit 132 (e.g., TDC or ADC) for each row 114 of sensor elements 110 in the array of sensor elements, e.g., N row-specific converter circuits. In an embodiment, each row-specific converter circuit 132 (e.g., TDC or ADC) for a row of sensor elements is electrically connected to the respective row event trigger line 130 so that the row-specific converter circuit 132 can convert an analog signal that is carried on the respective row event trigger line into digital data. Example embodiments of column/row-specific converter circuits in the form of TDCs and ADCs are described below. The TDCs and/or ADCs may be configured to detect analog characteristics (e.g., amplitude/magnitude and/or phase) and/or digital characteristics (e.g., arrival time and/or delay).

In an embodiment, the digital data processor 108 includes a central processing unit (CPU), a graphics processing unit (GPU), or a field programmable gate array (FPGA), or some combination thereof. The digital data processor is connected to receive digital data from both the column sensor block 104 and the row sensor block 106.

The sensor system 100 may include additional elements/circuits as is known in the field. For example, the sensor system may be embodied in an IC device that includes, for example, "on-chip" memory, power management, and input/output components.

Figure 2:
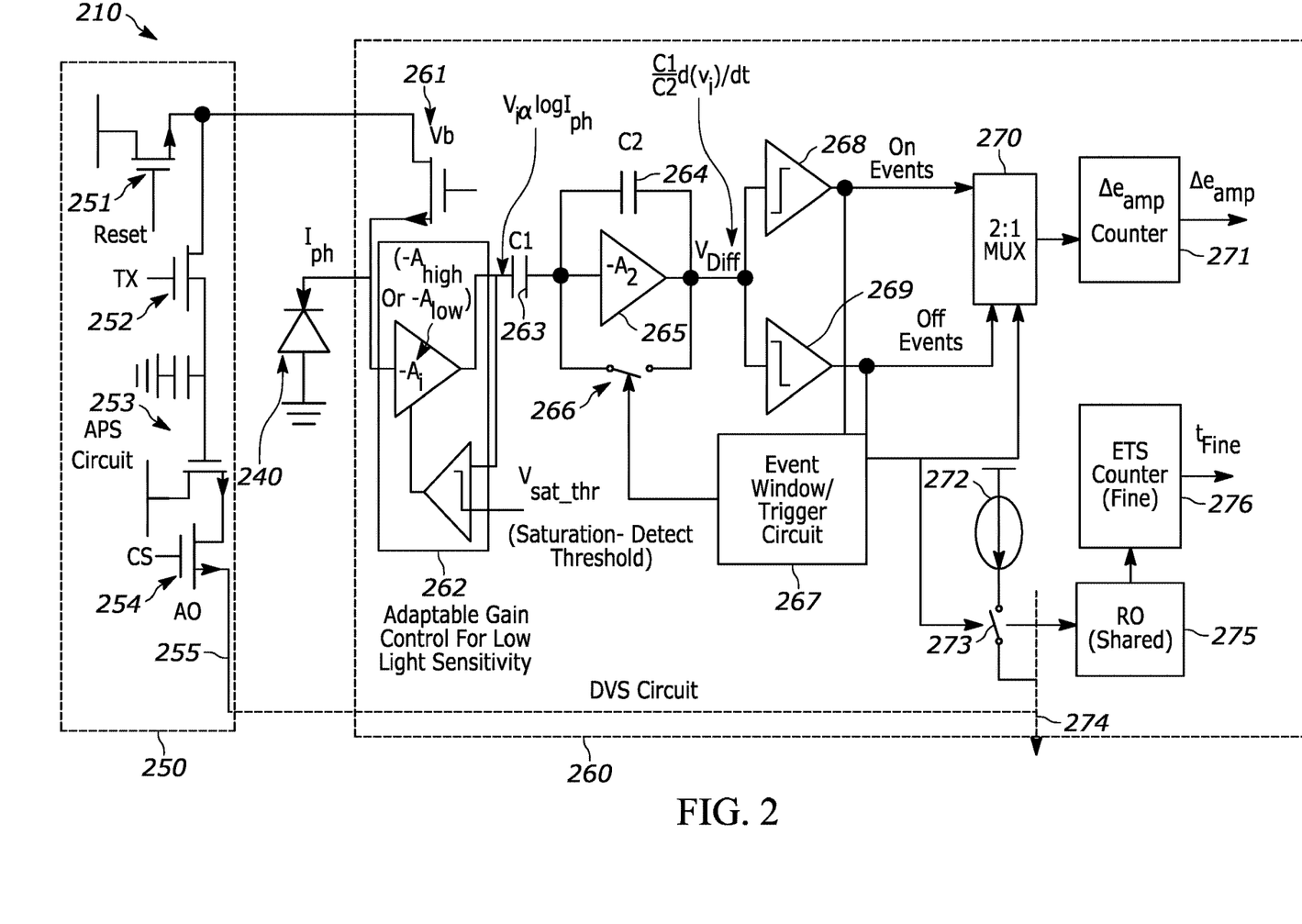
FIG. 2 is an example of one sensor element of the array of sensor elements as shown in FIG. 1.

In an embodiment, each sensor element 110 of the array 102 of sensor elements includes a detector circuit, an active pixel sensor (APS) circuit, and a dynamic vision sensor (DVS) circuit. FIG. 2 is an example of one sensor element 210 of the array 102 of sensor elements 110 as shown in FIG. 1. In the example of FIG. 2, the sensor element 210 includes a detector circuit 240, an APS circuit 250, and a DVS circuit 260.

In the embodiment of FIG. 2, the detector circuit 240 includes a photodiode that generates a current, Iph, in response to detection of electromagnetic energy, e.g., electromagnetic energy in the visible light spectrum. Although one example of a detector circuit is shown in FIG. 2, other embodiments of the detector circuit are possible.

In the embodiment of FIG. 2, the APS circuit 250 includes a reset transistor 251 (Reset), a transmission transistor 252 (TX), a readout transistor 253 (amplifier), a column select (CS) transistor 254, and an analog output 255 (AO). In an embodiment, the analog output 255 (AO) is connected to a column line, e.g., to a column event trigger line as described below. In an embodiment, the analog output 255 (AO) may also be connected to a row line, e.g., to a row event trigger line (FIG. 1, 130). The reset transistor 251 and the transmission transistor 252 are also electrically connected to the DVS circuit 260. Although a particular example of an APS circuit is described with reference to FIG. 2, other configurations of the APS circuit can be implemented in the sensor system.

In the embodiment of FIG. 2, the DVS circuit 260 includes a current controlling transistor 261 (Vb), an adaptable gain control circuit 262, a first capacitor 263 (C1), a second capacitor 264 (C2), an amplifier 265 (−A2), a switch 266, an event window/trigger circuit 267, a first comparator 268, a second comparator 269, a multiplexer 270 (e.g., 2:1 MUX), an error amplitude digital storage unit 271, a signal source 272, an event trigger switch 273, a column event trigger line 274, a ring oscillator 275 (RO), and an Event Timer Stamp (ETS) counter 276. In an embodiment, analog output 255 (AO) of the APS circuit 250 is electrically connected to the column event trigger line 274 as shown in FIG. 2. In operation, the column event trigger line 274 carries an analog signal from the signal source (272) when the column select (CS) transistor 254 is "off" or "open" and the event trigger switch 273 is "on" or "closed" and the column event trigger line 274 carries an analog signal (e.g., analog output 255) from the APS circuit 250 when the column select (CS) transistor 254 is "on" or "closed."

As shown in FIG. 2, the signal source 272 is connected to the column event trigger line 274 and the event trigger switch 273 is connected between the signal source 272 and the column event trigger line 274. The event window/trigger circuit 267 (also referred to as the event trigger circuit) is configured to generate an event trigger signal that controls the event trigger switch 273, thereby controlling application of a signal from the signal source 272 onto the column event trigger line 274. In an embodiment, the event window/trigger circuit 267 is configured to 1) generate an event trigger signal when an event has been detected at the sensor element, and 2) generate a reset signal for the event sensing components (e.g., the second capacitor 264 (C2), the amplifier 265 (-A2), the first comparator 268, and the second comparator 269) of the DVS circuit. Although not shown, the DVS circuit 260 may also include a row event trigger line, such as the row event trigger lines shown FIG. 1. In an embodiment, the signal source 272 (e.g., a current source) is a current sink circuit that produces a current although the signal source may be a source of some other type of electrical signal. The signal source 272 may be connected to the row event trigger line (not shown) and application of current on the row event trigger line may also be controlled by the trigger event switch 273. In other embodiments, there may be a signal source and/or event trigger switch specific to the row event trigger line. In an embodiment, the analog output 255 (AO) of the APS circuit 250 is also electrically connected to a row event trigger line (not shown in FIG. 2). In operation, a row event trigger line (e.g., FIG. 1, 130) carries an analog signal from the signal source (272) when the column select (CS) transistor 254 is "off" or "open" and the event trigger switch 273 is "on" or "closed" and the row event trigger line (not shown in FIG. 2) carries an analog signal (e.g., analog output 255) from the APS circuit 250 when a row select transistor (not shown) is "on" or "closed."

In accordance with an embodiment of the invention, events at sensor elements (e.g., pixels) are communicated from the sensor elements by providing a signal (e.g., a current pulse) on a corresponding event trigger line in response to a pixel-specific event trigger signal. In an embodiment, the event window/trigger circuit 267 receives the outputs from the ON events comparator 268 and from the OFF events comparator 269 and determines when an event has been detected in response to the received signals. In response to the event window/trigger circuit 267 detecting an event at the sensor element 210, the event window/trigger circuit 267 outputs a pixel-specific event trigger signal to the event trigger switch 273. In an embodiment, the pixel-specific event trigger signal causes the event trigger switch 273 to "close" and/or turn "on" so that current from the signal source 272 is conducted on the column event trigger line 274.

Although the sensor element 210 shown in FIG. 2 includes only a column output line 255 and a column trigger line 274, in an embodiment, the sensor element also includes a row output line and a row trigger line. Additionally, although a particular example of a DVS circuit is described with reference to FIG. 2, other configurations of the DVS circuit can be implemented in the sensor system.

Figure 3A:
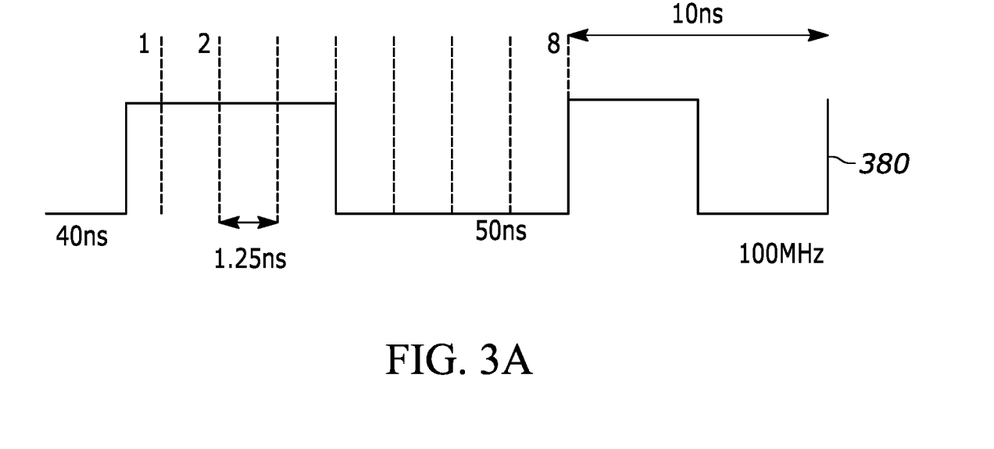
FIG. 3A shows a system clock of divided into time divisions.

As described with reference to FIG. 2, an event signal (e.g., a current pulse) is applied to an event trigger line in response to detecting an event at a particular sensor element. In one embodiment of a sensor system, the column-specific and row-specific converter circuits are TDCs. An implementation of a sensor system that uses TDCs is described with reference to FIGS. 3A-3C. In an embodiment, TDC based Address Event Representation (AER) works by TDCs detecting the pulses generated by each event-holding (pixels with events) pixels (e.g., sensor elements) and generating a timestamp, e.g., a 3-bit timestamp, in response to a pulse. In an embodiment, the TDCs work on an 800 MHz clock (in this example) with a 3-bit counter (8 time-divisions). The corresponding timestamps, in addition to providing timing accuracy, also provide the location (e.g., as spatial coordinates) of the pixel. As described above, in an embodiment, each column of sensor elements has a corresponding column-specific TDC at the end of the corresponding column event trigger line and each row of sensor elements has a corresponding row-specific TDC at the end of the corresponding row event trigger line. In an embodiment, the TDCs works with 800 MHz precision accuracy dividing a system clock of, for example, 100 MHz in to 8 time divisions (e.g., using 3-bits). FIG. 3A shows a system clock 380 of 100 MHz divided into 8 equal time divisions (3-bits) of 1.25 ns per time division. In an embodiment, the data is read into the digital data processor (e.g., CPU/GPU/FPGA) with a clock synchronous to the system clock, hence the system clock is the reference clock for a higher resolution timestamp (eventually generated in the digital data processor). Although an example system clock speed and an example time division are described and illustrated, other clock speeds and time division increments are possible.

Figure 3B:
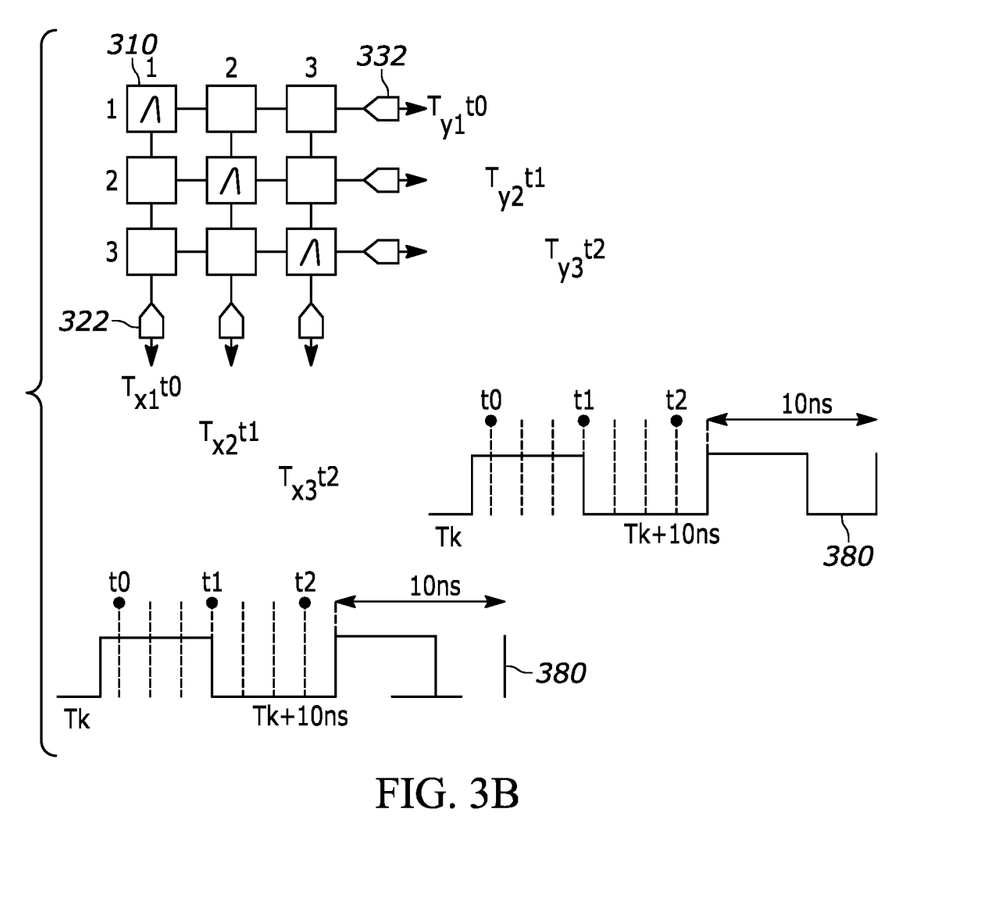
FIG. 3B illustrates an example operation of a 3×3 sensor/pixel array that includes three TDCs on the x-axis and three TDCs on y-axis.

FIG. 3B illustrates an example operation using a 3×3 array (columns×rows) of sensor elements/pixels with three TDCs on the x-axis (one column-specific TDC per column) and three TDCs on the y-axis (one row-specific TDC per row). In particular, FIG. 3B shows an array of sensor elements 310 (e.g., pixels), column-specific detector circuits 322 (TDCs), row-specific detector circuits 332 (TDCs), and corresponding column timing and row timing graphs that include the system clock 380. In the example of FIG. 3B, the sensor elements 310 (e.g., pixels) are identified by column positions 1, 2, 3 and row positions 1, 2, 3 as having spatial coordinates in the array of P1,1, P1,2, P1,3, P2,1, P2,2, P2,3, P3,1, P3,2, and P3,3. As indicated by the "pulse" symbols within three of the sensor elements 310 in FIG. 3B, a sequence of events are detected in sensor elements (e.g., pixels) P1,1, P2,2, and P3,3 over a time scale of 10 ns at times t0, t1 and t2, whose positions with reference to the system clock (represented by Tk) are shown in the timing diagrams of FIG. 3B.

In the embodiment of FIG. 3B, the TDCs 322 and 332 each have a 3-bit counter with pulse detection, although counters with more or fewer bits are possible. In operation, each TDC generates a 3-bit timestamp (stored in its counter) in response to detecting an event pulse on the respective column/row pulse lines (pulse detection output "1"). In the example of FIG. 3B, the TDCs are run by an 800 MHz clock and have an accuracy of 1.25 ns, although other clocks speeds and accuracy increments are possible.

Figure 3C:
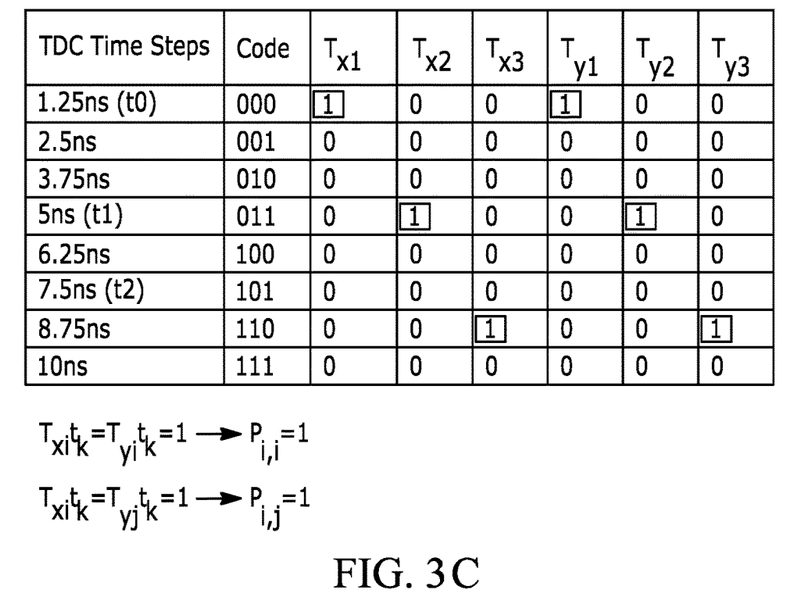
FIG. 3C is a table of timestamps that correspond to the events shown in FIG. 3B.

FIG. 3C is a table of timestamps that correspond to the events shown in FIG. 3B. The timestamps of TDCs in the row (Tx$_i$) are compared with timestamps of TDCs in column (Ty$_j$) at a common timestamp of tk as shown in FIG. 3C. When there is a pulse detected on both column and row TDCs of a sensor element that have the same timestamps, the pixel location (Pi,j) is identified. In the example of FIG. 3C, a pulse is detected at time t0 for TDCs Tx1 and Ty1, a pulse is detected at time t1 for TDCs Tx2 and Ty2, and a pulse is detected at time t2 for TDCs Tx3 and Ty3. The detected pulses represent events being identified at pixels having spatial coordinates of P1,1, P2,2, and P3,3, respectively. In an embodiment, the timing data is read into the digital data processor (e.g., CPU/GPU/FPGA) with a clock synchronous to the system clock, and the matching logic to determine spatial coordinates of the pixels, at which events have been detected, is implemented in the digital data processor (e.g., FIG. 1, 108).

In an embodiment, the event window/trigger circuit (FIG. 2, 267) of a DVS circuit of a sensor element includes a double log amplifier output to determine the event rate and classify the scene as "rapid dynamic" or "slow dynamic". This allows the Event Window to set the reset time to shorter durations. Once an event is detected and an event trigger signal is applied to the event trigger switch (FIG. 2, 273), the signal source (FIG. 2, 272) will start sinking a small current onto the column event trigger line (FIG. 2, 274). The current pulse results in spikes of different rise time and amplitude depending on how many sensor elements in the same column have been triggered and the location of the sensor elements in the column of sensor elements. The variation in rise time and amplitude is due to RC delay of each pixel to the column line readout circuit (e.g., the TDC or ADC). A similar process will occur with respect to the corresponding row of sensor elements at which the event occurs. For example, once the event is detected and the event trigger signal is applied to the event trigger switch, the signal source will start sinking a small current onto the row event trigger line (not shown in FIG. 2). The current pulse results in spikes of different rise time and amplitude depending on how many sensor elements in the same row have been triggered and the location of the sensor elements in the row of sensor elements. The variation in rise time and amplitude is due to RC delay of each pixel to the row line readout circuit (e.g., the TDC or ADC). In an embodiment, the pulses are read with low latency (e.g., <1 ns), high sampling rate (e.g., 500 MS/s), low power (e.g., ~1 mW per ADC) ADCs.

Figure 4A:
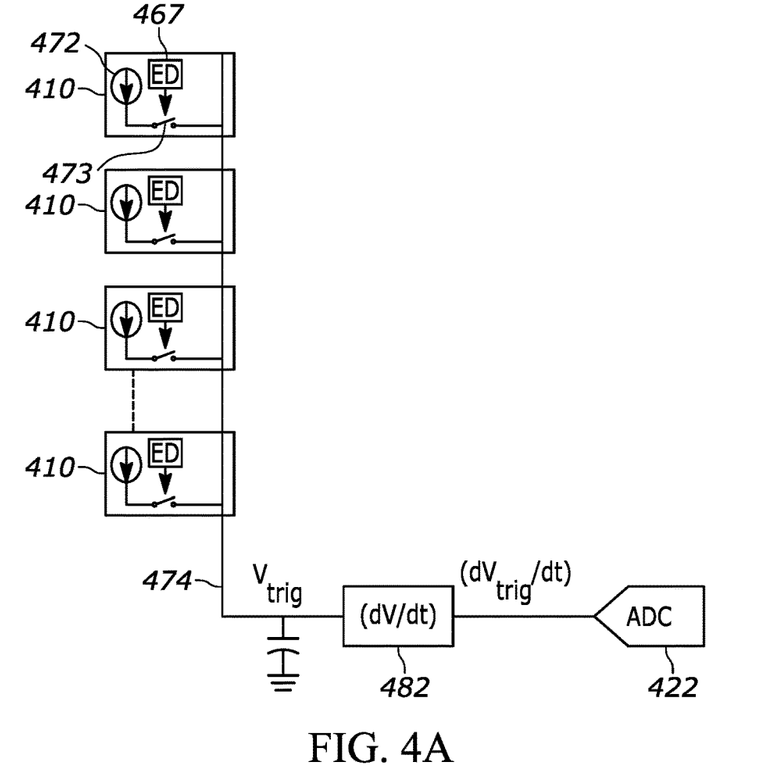
FIG. 4A depicts a row of sensor elements and an ADC that are electrically connected to each other by a column event trigger line.

FIG. 4A depicts a column of sensor elements 410, an analog pre-processing circuit 482, and an ADC 422 (as the column-specific converter circuit) that are electrically connected to each other by a column event trigger line 474. Each sensor element includes a signal source 472, an event detector circuit 467, and an event trigger switch 473 (reference numbers included only for one sensor element). When an event is detected by the event detector circuit of a particular sensor element, a pixel-specific event trigger signal is output from the event detector circuit of the sensor element and the pixel-specific event trigger signal causes the event trigger switch of the sensor element to close, which causes a signal (e.g., a current pulse) to be applied to the column event trigger line 474. Although in the embodiment of FIG. 4A, the column includes the pre-processing circuit 482, in other embodiments, the column may not include a pre-processing circuit.

The signal on the column event trigger line 474 is processed by the pre-processing circuit 482 and then detected by the ADC 422, which generates and outputs digital data that can be processed by the digital data processor (FIG. 1, 108) to detect an event at the particular pixel. In the embodiment of FIG. 4A, the pre-processing involves a derivative operation although other pre-processing operations may be applied to the analog signal before reaching the ADC 422. The resulting digital data (e.g., both from the column and the row of the pixel) can be processed to locate/identify a specific pixel, or group of pixels, in the corresponding column and/or row. For example, processing of the spike in a spike neural network (SNN) (with further latency of few ns) enables a group (super pixel) of pixels to be located/identified. In an embodiment, a 4-bit (2 bits for row and 2 bits for column, 4×4, in a group of 16 pixels) representation within a group of pixels can be used to locate the specific pixel that has an event, which may include identifying the spatial coordinates of the specific pixel in the array of pixels. In an embodiment, only least significant bits (LSB)s are read out from the in-pixel event time stamp (ETS) counter to provide fine time accuracy. In an embodiment, the ETS can store up to 6 bits. This can reduce latency and throughput by several orders and can increase array utilization rate (up to 100%).

Figure 4B:
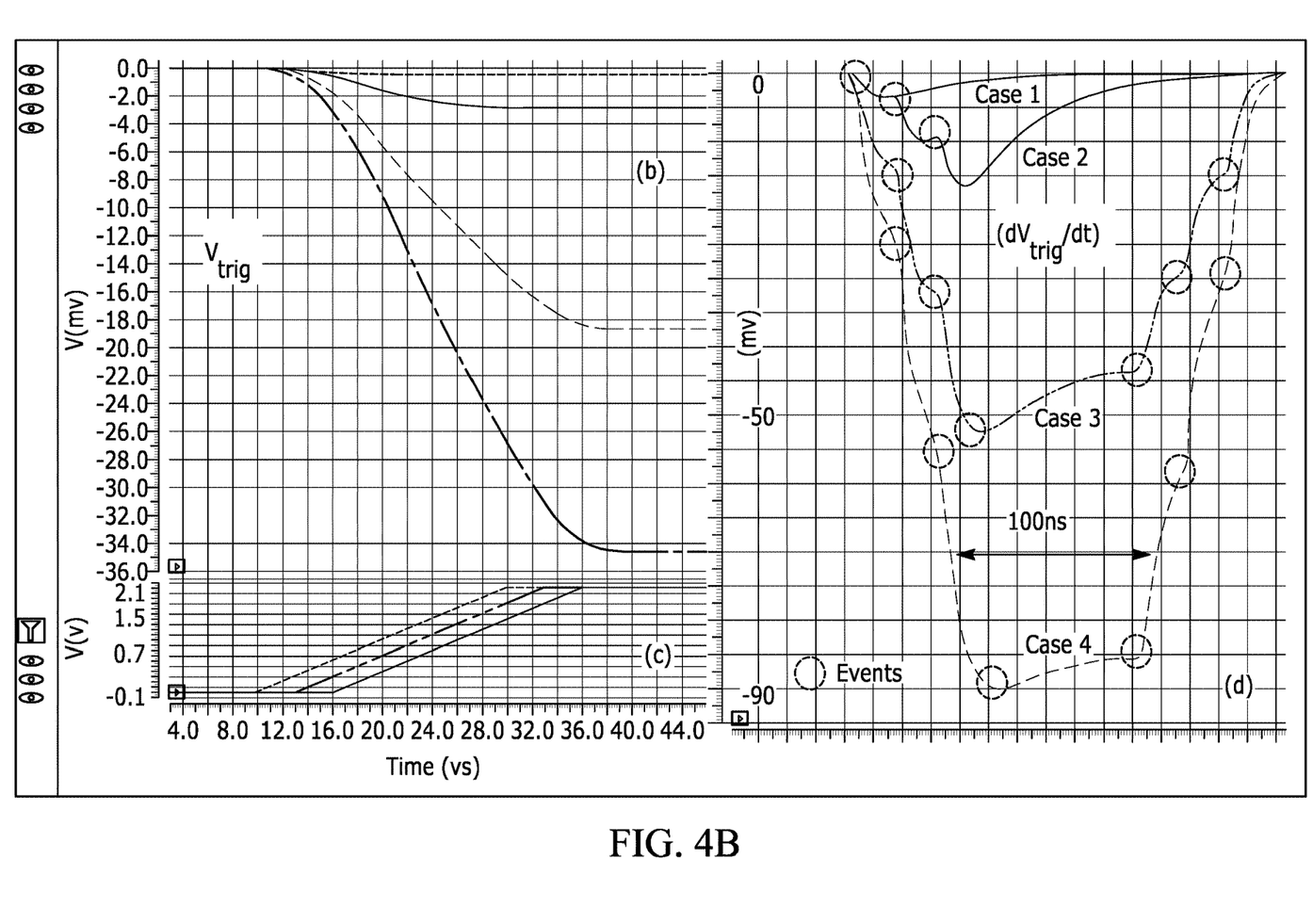
FIG. 4B illustrates signal graphs corresponding to the row of sensor elements, the pre-processing circuit, and the ADC shown in FIG. 4A.

FIG. 4B illustrates signal graphs corresponding to the circuit shown in FIG. 4A. Section (b) of FIG. 4B depicts different event trigger signals that are carried on the column event trigger line 474 and detected by the ADC 422, with the different event trigger signals representing different combinations of events being detected at the sensor elements 410 over some period of time. Section (c) of FIG. 4B depicts an example phase delay (as detected on the column event trigger line 474) between two different event trigger signals that are applied from two different sensor elements 410 in the column of FIG. 4A. Section (d) of FIG. 4B depicts the derivative of analog signals received at the ADC 422 for four different cases. For example, case 1 is the derivative of an analog signal that represents a single event at a single sensor element, case 2 is the derivative of an analog signal that represents three different events at different sensor elements in the column, case 3 is the derivative of an analog signal that represents seven different events at different sensor elements in the column, and case 4 is the derivative of an analog signal that represents eight different events at different sensor elements in the column. The signals as shown in FIG. 4B can be processed by the digital data processor (FIG. 1, 108) to determine the timing and spatial coordinates of the sensor elements (pixels) in the column at which events have been detected. In an embodiment, the inflection points in the signals in section (d) can be an indicator of the timing of pulses being applied to the column event trigger line and the corresponding amplitude can be an indicator of the location of the particular sensor element in the column of sensor elements from which the pulse was applied to the column event trigger line.

A similar circuit configuration and operation as described with reference to FIGS. 4A and 4B can apply to rows of pixels. For example, the configuration and operation of the column of sensor elements and the ADC shown in FIG. 4A can be applied to a row of sensor elements and a row-specific ADC. In an embodiment, the column-specific digital data can be processed along with corresponding row-specific digital data to determine the timing and spatial coordinates of the sensor elements (pixels) in the array at which events have been detected.

To accommodate long latencies in high array utilization rate, an in-pixel temporal data change counter (also called as error amplitude counter, $\Delta e_{amp}$) is provided for cases such as dynamic, high intensity events or high array utilization rate. Note that this is stored as an error so that it will be used to offset/calibrate the value read by the final readout.

$e = [x_{sub-group}, y_{sub-group}, p, t_{fine}, \Delta e_{amp}]$

Low Light Intensity Challenge: Each pixel of an event-based camera responds to changes in their log photocurrent L=log(I). In a noise-free scenario, an event, ek, is defined by an expression dependent on a universally agreed format (xk, yk, tk, pk) at time, tk, as soon as the brightness increment (pk holds the information of brightness increase) since the last event at the pixel for a pixel located at (xk,yk). The temporal change in brightness can be expressed as ΔL(xk, yk, tk)=L (xk, yk, tk)−L(xk, yk, tk−Δtk). This change reaches a temporal contrast threshold ±C, i.e., ΔL(xk, yk, tk)=pk C, where C>0. Δtk is the time elapsed since the last event at the same pixel, and the polarity pk∈{+1, −1} is the sign of the brightness change. The contrast sensitivity, C, is determined by the pixel bias currents, which set the speed and threshold voltages of the change detector and are generated by an on-chip digitally-programmed bias generator. The contrast sensitivity, C, can be estimated knowing these currents. For high contrast situations and a low latency requirement, the pixel current saturates the front-end analog amplifiers to achieve low contrast by reducing the bias currents, resulting in slow event detection and high inaccurate timing. In an embodiment, this problem is addressed by integrating an adaptable gain at the input front-end to discriminate the scene between low-light sensitivity and high light sensitivity as shown in FIG. 2. A front-end 2-transistor high speed comparator will detect the saturation of the first stage of the analog-front end and change the gain of the amplifier by switching it's feedback capacitor. This enables the pixel to operate continuously between different gains (for low light and high intensity scenarios) without effecting the speed and accuracy of the event detection.

In an embodiment, the APS is a standard pixel design, while the DVS is an innovative architecture that includes the signal source connected to an event trigger line and controlled by an event trigger switch that is controlled by an event window/trigger circuit. In an embodiment, the DVS has a neuromorphic processor tunable event window/trigger block which lets the processor control the threshold event storage allowing a neuromorphic computing at pixel level. In an embodiment, the event window/trigger uses a double log amplifier output to determine the event rate and classify the scene as "rapid dynamic" or "slow dynamic." This allows the Event Window/Refractory Period block to set the reset time to shorter durations using the neuromorphic processor. Another innovation is that once an event is triggered, a signal source will start sinking a small current on to a column and row event trigger lines (in FIG. 2 an example shown is for column level event trigger (CET)). This results in spikes of different rise time and amplitude depending on how many pixels have been triggered and the location of the pixels in column and row thereby producing a column weight for the neuromorphic processor. This additional "feature" extraction for a group of pixels enables higher efficient algorithms for applications such as target/s locking, tracking and data compression. Such an APS+DVS type of analog front end enables IR scene detections more accurate than typical DVS/Dynamic and Active Pixel Vision Sensor (DAVIS) sensors. DVS/DAVIS sensors while having large dynamic range, typically do not address low light scenes (e.g., such as low light scenarios in battlefields) where noise can become more critical than dynamic range. In the disclosed pixel front-end, an adaptable gain control for the front-end amplifier reduces the noise on the detector. The APS enables synchronous low noise intensity image frequently for scene calibration and reference scenes for DVS frame change estimation.

Figure 5:
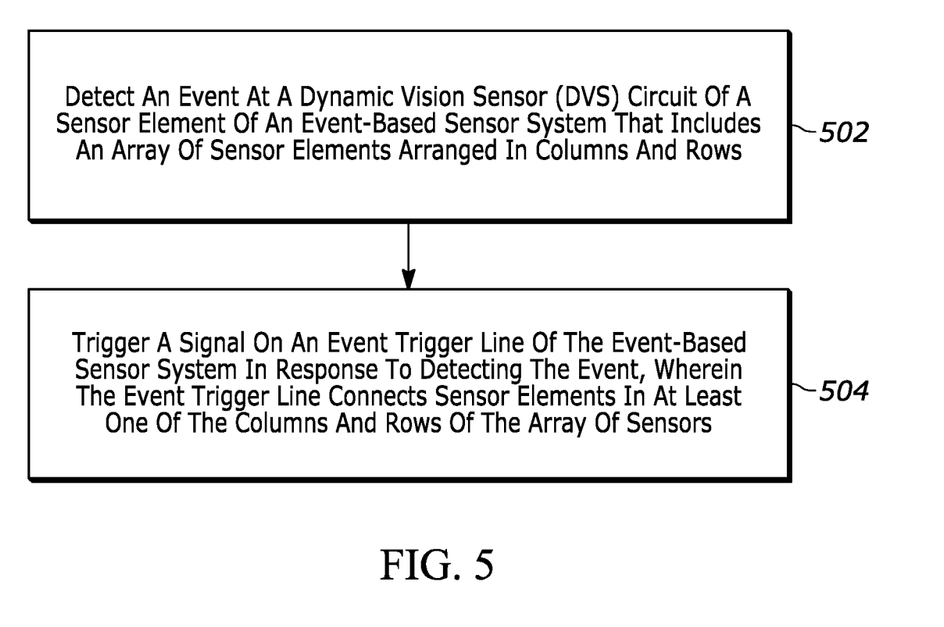
FIG. 5 is a flow diagram of a method a method for operating a sensor system.

FIG. 5 is a flow diagram of a method for operating a sensor system. The method involves, at block 502, detecting an event at a DVS circuit of a sensor element of an event-based sensor system that includes an array of sensor elements arranged in columns and rows, and at block 504, triggering a signal on an event trigger line of the event-based sensor system in response to detecting the event, wherein the event trigger line connects sensor elements in at least one of the columns and rows of the array of sensors. In one example of the method, triggering a signal on the event trigger line includes generating an event trigger signal in response to detecting the event, and activating an event trigger switch to connect a signal source of the sensor element to the event trigger line. In one example of the method, triggering a signal on the event trigger line includes generating an event trigger signal at the DVS circuit of the sensor element in response to detecting the event at the DVS circuit, and activating an event trigger switch of the DVS circuit to connect a signal source of the sensor element to the event trigger line. In one example of the method, triggering a signal on the event trigger line includes triggering a signal on a column event trigger line of the sensor system and triggering a signal on a row event trigger line of the sensor system. In one example, the method further includes converting the signals on the column and row event trigger lines to digital data, and identifying the sensor element at which the event was detected in response to the digital data. In an example, the signals are converted by column/row-specific TDCs of the sensor system and in another example, the signals are converted by column/row-specific ADCs of the sensor system.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A sensor system comprising:
an array of sensor elements arranged in columns and rows;
column event trigger lines connecting sensor elements in the same column;
row event trigger lines connecting sensor elements in the same row;
wherein each sensor element in the array of sensor elements includes:
a detector circuit;
an active pixel sensor (APS) circuit;
a dynamic vision sensor (DVS) circuit, the DVS circuit including;
a signal source connected to a respective column event trigger line and a row event trigger line, wherein the signal source comprises a current sink;
an event trigger switch connected between the signal source and the respective column event trigger line and row event trigger line;
an event trigger circuit configured to generate an event trigger signal that controls the event trigger switch in response to detection of an event at the sensor element, thereby controlling application of an analog signal from the signal source onto the respective column event trigger line and row event trigger line;
wherein response to the signal, the signal source sinks a current on the respective column event trigger line and row event trigger line, which results in a different rise time and amplitude of the analog signal on the respective column event trigger line and row event trigger line depending on how many sensor elements have been triggered on the same column event trigger line and depending on how many sensor elements have be triggered on a same row event trigger line.

2. The sensor system of claim 1, further comprising:
a column-specific converter circuit connected to each column event trigger line; and
a row-specific converter circuit connected to each row event trigger line.

3. The sensor system of claim 2, further comprising a digital data processor configured to identify a sensor element in the array of sensor elements at which the event was detected in response to digital data from the column-specific detector circuits and from the row-specific detector circuits.

4. The sensor system of claim 2 wherein the column-specific converter circuits and the row-specific converter circuits are time-to-digital converters (TDCs).

5. The sensor system of claim 2 wherein the column-specific converter circuits and the row-specific converter circuits are analog-to-digital converters (ADCs).

6. The sensor system of claim 2 wherein the column-specific converter circuits and the row-specific converter circuits are analog-to-digital converters (ADCs), wherein inflection points in the analog signals from the column-specific converter circuits and from the row-specific converter circuits are indicative of timing of events and wherein amplitudes of the analog signals from the column-specific converter circuits and from the row-specific converter circuits are indicative of a location of particular sensor elements in the array of sensor elements.

7. The sensor system of claim 1, wherein each DVS circuit of each sensor element is connected to both a column event trigger line and a row event trigger line such that the analog signal from the signal source is applied to both the column event trigger line and the row event trigger line.

8. A method for operating a sensor system, the method comprising:
detecting an event at a dynamic vision sensor (DVS) circuit of a sensor element of an event-based sensor system that includes an array of sensor elements arranged in columns and rows; and
triggering an analog signal on an event trigger line of the event-based sensor system in response to detecting the event, wherein the event trigger line connects sensor elements in at least one of the columns and rows of the array of sensors;
generating an event trigger signal at the DVS circuit of the sensor element in response to detecting the event at the DVS circuit; and
activating an event trigger switch of the DVS circuit to connect a current sink of the sensor element to the event trigger line;
wherein, in response to the event trigger signal the current sink sinks a current on to the respective event trigger line, which results in a different rise time and amplitude of the analog signal on the respective event trigger line depending on how many sensor elements have been triggered on the same event trigger line.

9. The method of claim 8, wherein triggering an analog signal on the event trigger line includes triggering an analog signal on a column event trigger line of the sensor system and triggering an analog signal on a row event trigger line of the sensor system.

10. The method of claim 9, further comprising converting the analog signals on the column and row event trigger lines to digital data, and identifying the spatial coordinates of the sensor element at which the event was detected in response to the digital data.

11. The method of claim 10, further comprising converting the analog signals on the column and row event trigger line to digital data with column and row specific time-to-digital converters (TDCs).

12. The method of claim 10, further comprising converting the anal signals on the column and row event trigger line to digital data with column and row specific analog-to-digital converters (ADCs).

13. The method of claim 10, further comprising converting the analog signals on the column and row event trigger line to digital data with column and row specific analog-to-digital converters (ADCs), wherein inflection points in the analog signals from the column-specific converter circuits and from the row-specific converter circuits are indicative of timing of events and wherein amplitudes of the analog signals from the column-specific converter circuits and from the row-specific converter circuits are indicative of a location of particular sensor elements in the array of sensor elements.

* * * * *